United States Patent
Svetov et al.

(10) Patent No.: US 9,741,006 B2
(45) Date of Patent: Aug. 22, 2017

(54) SYSTEM AND METHOD FOR PROVIDING COMPLEX ACCESS CONTROL IN WORKFLOWS

(75) Inventors: Vladimir Svetov, Foster City, CA (US); Ravi Rangaswamy, Fremont, CA (US); Mohan Kamath, Fremont, CA (US); Viswanathan Umapathy, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 398 days.

(21) Appl. No.: 12/780,183

(22) Filed: May 14, 2010

(65) Prior Publication Data
US 2011/0283281 A1    Nov. 17, 2011

(51) Int. Cl.
G06Q 10/00    (2012.01)
G06Q 10/08    (2012.01)
G06F 21/60    (2013.01)

(52) U.S. Cl.
CPC ........... G06Q 10/08 (2013.01); G06F 21/604 (2013.01)

(58) Field of Classification Search
CPC ........... G06F 2221/2141; G06F 21/604; G06F 17/30893
See application file for complete search history.

(56) References Cited

U.S. PATENT DOCUMENTS

| | | | |
|---|---|---|---|
| 5,721,913 A | 2/1998 | Ackroff et al. | |
| 5,799,297 A | 8/1998 | Goodridge et al. | |
| 5,930,512 A | 7/1999 | Boden | |
| 5,978,836 A | 11/1999 | Ouchi | |
| 5,999,911 A | 12/1999 | Berg | |
| 6,003,011 A | 12/1999 | Sarin et al. | |
| 6,026,365 A | 2/2000 | Hayashi | |
| 6,161,113 A | 12/2000 | Mora et al. | |
| 6,170,002 B1 | 1/2001 | Ouchi | |
| 6,308,224 B1 | 10/2001 | Leymann et al. | |
| 6,349,287 B1 | 2/2002 | Hayashi | |
| 6,397,182 B1 | 5/2002 | Cruickshank et al. | |
| 6,397,191 B1 | 5/2002 | Notani et al. | |
| 6,411,314 B1 | 6/2002 | Hansen | |
| 6,449,643 B1 * | 9/2002 | Hyndman | G06F 21/629 709/223 |

(Continued)

OTHER PUBLICATIONS

Kuleshov "Human Task Allocation Manager" (2009) Exadel Inc. (http://exadelfs.com/knowledgebase/whitepapers/ExadelFSHuman-Tasks-Allocation-Manager-3-0.pdf).

(Continued)

*Primary Examiner* — Tiphany Dickerson
(74) *Attorney, Agent, or Firm* — Tucker Ellis LLP (57) ABSTRACT

A system for providing complex access control in workflows. The system comprises a computer, including a computer readable storage medium and processor operating thereon. The system also comprises at least one business process which includes a plurality of tasks. Each task is associated with a task state which changes during execution of the task. The system further comprises a plurality of logical roles. Each logical role defines a responsibility based on the task state and a member of that logical role. Additionally, the system comprises a configurable matrix of access controls that is used to control access to the plurality of tasks based on the plurality of logical roles.

20 Claims, 6 Drawing Sheets

(56) References Cited

U.S. PATENT DOCUMENTS

| | | | |
|---|---|---|---|
| 6,470,227 B1 | 10/2002 | Rangachari et al. | |
| 6,507,845 B1 | 1/2003 | Cohen et al. | |
| 6,519,642 B1 | 2/2003 | Olsen et al. | |
| 6,567,783 B1 | 5/2003 | Notani et al. | |
| 6,574,675 B1 | 6/2003 | Swenson | |
| 6,574,736 B1 | 6/2003 | Andrews | |
| 6,584,487 B1 | 6/2003 | Saboff | |
| 6,606,740 B1 | 8/2003 | Lynn et al. | |
| 6,725,428 B1 | 4/2004 | Pareschi | |
| 6,742,015 B1 | 5/2004 | Bowman-Amuah | |
| 6,792,604 B1 | 9/2004 | Hickson | |
| 6,889,231 B1 | 5/2005 | Souder et al. | |
| 6,895,573 B2 | 5/2005 | Norgaard | |
| 6,970,844 B1 | 11/2005 | Bierenbaum | |
| 6,988,139 B1 | 1/2006 | Jervis | |
| 7,020,697 B1 | 3/2006 | Goodman et al. | |
| 7,062,749 B2 | 6/2006 | Cyr et al. | |
| 7,080,099 B2 | 7/2006 | Tada | |
| 7,117,500 B2 | 10/2006 | Pulsipher | |
| 7,155,720 B2 | 12/2006 | Casati | |
| 7,236,939 B2 | 6/2007 | Chen et al. | |
| 7,266,764 B1 | 9/2007 | Flam | |
| 7,272,816 B2 | 9/2007 | Schulz et al. | |
| 7,284,265 B2 * | 10/2007 | Choy | G06F 21/6218 726/18 |
| 7,289,966 B2 | 10/2007 | Ouchi | |
| 7,356,611 B1 | 4/2008 | Stork | |
| 7,370,335 B1 | 5/2008 | White et al. | |
| 7,379,945 B1 * | 5/2008 | Hirsch | G06F 17/2241 |
| 7,403,989 B2 | 7/2008 | Beringer et al. | |
| 7,406,432 B1 | 7/2008 | Motoyama | |
| 7,418,475 B2 | 8/2008 | Stewart et al. | |
| 7,428,495 B2 | 9/2008 | Dhar et al. | |
| 7,448,046 B2 | 11/2008 | Navani et al. | |
| 7,464,366 B2 | 12/2008 | Shukla et al. | |
| 7,493,593 B2 | 2/2009 | Koehler | |
| 7,498,866 B2 | 3/2009 | Choi | |
| 7,519,711 B2 | 4/2009 | Mohindra et al. | |
| 7,543,292 B2 * | 6/2009 | Haller et al. | 718/100 |
| 7,603,674 B2 | 10/2009 | Cyr et al. | |
| 7,631,291 B2 | 12/2009 | Shukla et al. | |
| 7,653,562 B2 | 1/2010 | Schulz | |
| 7,676,483 B2 * | 3/2010 | Klug | G06Q 10/06 703/6 |
| 7,680,683 B2 | 3/2010 | Hilerio et al. | |
| 7,685,604 B2 | 3/2010 | Baartman et al. | |
| 7,702,736 B2 | 4/2010 | Ouchi | |
| 7,774,827 B2 * | 8/2010 | Kinser | G06F 21/6218 726/2 |
| 7,814,142 B2 | 10/2010 | Mamou et al. | |
| 7,899,679 B2 | 3/2011 | MacKay | |
| 7,925,527 B1 | 4/2011 | Flam | |
| 7,937,406 B2 * | 5/2011 | Shirin | G06F 9/5072 707/782 |
| 8,112,257 B2 | 2/2012 | Weber | |
| 8,146,083 B2 | 3/2012 | Aggarwal et al. | |
| 8,170,897 B1 | 5/2012 | Cohen et al. | |
| 8,250,576 B2 | 8/2012 | Yildiz | |
| 8,321,257 B2 | 11/2012 | Motoyama | |
| 8,417,682 B2 | 4/2013 | Wilcox | |
| 8,793,807 B2 * | 7/2014 | Claussen | G06F 21/6218 726/1 |
| 9,020,831 B2 * | 4/2015 | Simske | G06F 17/30893 705/7.27 |
| 2002/0140731 A1 | 10/2002 | Subramaniam et al. | |
| 2002/0178119 A1 | 11/2002 | Griffin et al. | |
| 2002/0189070 A1 | 12/2002 | Noel et al. | |
| 2003/0046576 A1 | 3/2003 | High et al. | |
| 2003/0079180 A1 | 4/2003 | Cope | |
| 2003/0105974 A1 | 6/2003 | Griffin et al. | |
| 2003/0135384 A1 | 7/2003 | Nguyen | |
| 2003/0154403 A1 * | 8/2003 | Keinsley | G06F 21/41 726/8 |
| 2003/0158832 A1 | 8/2003 | Sijacic et al. | |
| 2004/0230466 A1 | 11/2004 | Davis et al. | |
| 2004/0230594 A1 * | 11/2004 | Flam | G06Q 10/10 |
| 2005/0027585 A1 | 2/2005 | Wodtke et al. | |
| 2005/0049924 A1 | 3/2005 | DeBettencourt et al. | |
| 2005/0071347 A1 | 3/2005 | Chau et al. | |
| 2005/0097166 A1 | 5/2005 | Patrick et al. | |
| 2006/0069995 A1 | 3/2006 | Thompson et al. | |
| 2006/0074703 A1 | 4/2006 | Bhandarkar et al. | |
| 2006/0074734 A1 | 4/2006 | Shukla et al. | |
| 2006/0074915 A1 | 4/2006 | Bhandarkar et al. | |
| 2006/0150156 A1 | 7/2006 | Cyr et al. | |
| 2006/0173869 A1 | 8/2006 | Byrne et al. | |
| 2006/0218394 A1 * | 9/2006 | Yang | 713/167 |
| 2006/0224432 A1 | 10/2006 | Li | |
| 2006/0229925 A1 | 10/2006 | Chalasani et al. | |
| 2006/0259524 A1 | 11/2006 | Horton | |
| 2007/0016465 A1 | 1/2007 | Schaad | |
| 2007/0061382 A1 | 3/2007 | Davis et al. | |
| 2007/0061776 A1 | 3/2007 | Ryan | |
| 2007/0156486 A1 | 7/2007 | Sanabria et al. | |
| 2007/0203589 A1 | 8/2007 | Flinn et al. | |
| 2007/0203881 A1 | 8/2007 | Schaad et al. | |
| 2007/0239499 A1 | 10/2007 | Shukla et al. | |
| 2007/0240112 A1 | 10/2007 | Haselden et al. | |
| 2007/0240231 A1 * | 10/2007 | Haswarey | G06F 21/6218 726/28 |
| 2007/0276715 A1 | 11/2007 | Beringer et al. | |
| 2008/0065656 A1 | 3/2008 | Theeten et al. | |
| 2008/0114627 A1 | 5/2008 | Baeuerie et al. | |
| 2008/0114791 A1 | 5/2008 | Takatsu | |
| 2008/0282250 A1 | 11/2008 | Marin | |
| 2008/0301684 A1 | 12/2008 | Barros et al. | |
| 2008/0306806 A1 | 12/2008 | Van Wyk et al. | |
| 2009/0031418 A1 * | 1/2009 | Matsuda | G06F 21/6218 726/21 |
| 2009/0125366 A1 | 5/2009 | Chakraborty et al. | |
| 2009/0164985 A1 | 6/2009 | Balko et al. | |
| 2009/0199293 A1 * | 8/2009 | Song et al. | 726/18 |
| 2009/0249293 A1 | 10/2009 | Davies | |
| 2009/0260021 A1 | 10/2009 | Haenel et al. | |
| 2009/0281865 A1 | 11/2009 | Stoitsev | |
| 2009/0307162 A1 | 12/2009 | Bui et al. | |
| 2009/0328205 A1 * | 12/2009 | Ims | G06F 21/6245 726/22 |
| 2010/0049574 A1 | 2/2010 | Paul et al. | |
| 2010/0100427 A1 | 4/2010 | McKeown et al. | |
| 2010/0106546 A1 | 4/2010 | Sproule | |
| 2010/0131916 A1 | 5/2010 | Prigge | |
| 2010/0205013 A1 | 8/2010 | Guyan et al. | |
| 2010/0223570 A1 * | 9/2010 | Gerstl | G06Q 10/06 715/772 |
| 2010/0235213 A1 | 9/2010 | Channabasavaiah | |
| 2010/0251242 A1 | 9/2010 | Sivasubramanian | |
| 2011/0078499 A1 | 3/2011 | Fong et al. | |

OTHER PUBLICATIONS

Agrawal, Ashish et al., Web Service Human Task (WS—HumanTask), Version 1.0 Active Endpoints, Inc., 2007.

Agrawal, Ashish et al., WS-BPEL Extension for People (BPEL4People), Version 1.0 Active Endpoints. Inc., 2007.

Bradshaw, Deanna et al., Oracle BPEL Process Manager Developer's Guide log (1 0.1.3.1 .O) Oracle, Jan. 2007.

Beecher, Virginia et al., Oracle Fusion Middleware Developer's Guide for Oracle SOA Suite, 1 I g Oracle, Dec. 2009.

Oracle Database Administrator's Guide 1 I g Oracle, Mar. 2008.

Oracle BPEL Process Manager—Data Sheet Oracle, 2009.

Rittman, Mark, Oracle Purchases Collaxa, Launchs Oracle BPEL Processs Manager RittmanMead.com, Jun. 30, 2004.

Clugage, Kevin et al., The Oracle BPEL Process Manager: BPEL + Human Workflow Oracle, Mar. 14, 2006.

BPEL4People—wikipedia definition Wikipedia.org, Retrieved Apr. 10, 201 2.

Kloppman, Matthias et al., WS-BPEL Extension for People—BPEL4People IBM, SAP, White paper, Jul. 2005.

Collaxa WSOS 2.0: An introduction Collaxa, Sep. 6, 2002.

(56) References Cited

OTHER PUBLICATIONS

Kennedy, Mark, Oracle BPEL Process Manager Quick Start Guide, 1 Og Oracle Sep. 2006.
Liu, Sa, Business Process Automation and Web Service Choreography Technische Universitat Hamburn-Harburg, Jun. 29, 2004.
Collaxa—Orchestration Server Developer's Guide Verion 2.0 Beta 2 Collaxa, 2002.
Kloppman, Matthias et al., WS-BPEL Extension for Sub-Processes—BPEL SPE IBm, SAP, Sep. 2005.
Oracle International Corporation, Oracle SOA Suite Developer's Guide 10g, 7.12 Creating a Human Workflow Task, 2006, 8 pages.
Oracle International Corporation, Oracle BPEL Process Manager, Quick Start Guide, 10g, Sep. 2006, 60 pages.
Oracle International Corporation, Oracle Workflow Developer's Guide, Release 12, Dec. 2006, 508 pages.
Unknown Author, TrackWise User's Guide, 2000, 180 pages, Sparta Systems, Inc. Hazlet, NJ, USA.

\* cited by examiner

| Task Content | Individual with Read Access | Individual with Write Access |
|---|---|---|
| ASSIGNEES | ASSIGNEES, CREATOR, OWNER, ADMIN, APPROVERS, REVIEWERS | -- |
| ATTACHMENTS | ADMIN, APPROVERS | ASSIGNEES, CREATOR, OWNER, REVIEWERS |
| COMMENTS | ADMIN, APPROVERS | ASSIGNEES, CREATOR, OWNER, REVIEWERS |
| DATES | ASSIGNEES, CREATOR, OWNER, ADMIN, APPROVERS, REVIEWERS | -- |
| FLEXFIELDS | ADMIN, APPROVERS, REVIEWERS | ASSIGNEES, CREATOR, OWNER |
| HISTORY | ASSIGNEES, CREATOR, OWNER, ADMIN, APPROVERS, REVIEWERS | -- |
| PAYLOAD | ADMIN, APPROVERS, REVIEWERS | ASSIGNEES, CREATOR, OWNER |
| REVIEWERS | ASSIGNEES, CREATOR, OWNER, ADMIN, APPROVERS, REVIEWERS | -- |
| Payload elements | Inherited from payload | Inherited from payload |

SYSTEM AND METHOD FOR PROVIDING COMPLEX ACCESS CONTROL IN WORKFLOWS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, which are each hereby incorporated by reference in their entirety:

U.S. patent application Ser. No. 12/780,340, titled "INTEGRATING EXTERNAL DATA IN HUMAN WORKFLOW TASKS", filed May 14, 2010;

U.S. patent application Ser. No. 12/780,661, titled "SYSTEM AND METHOD FOR FLEXIBLE CHAINING OF DISTINCT WORKFLOW TASK INSTANCES IN A BUSINESS PROCESS EXECUTION LANGUAGE WORKFLOW", filed May 14, 2010; now U.S. Pat. No. 9,589,240, issued Mar. 7, 2017;

U.S. patent application Ser. No. 12/780,348, titled "WORKFLOW TASK ROUTING BASED ON CARDINALITY OF TASK DATA", filed May 14, 2010;

U.S. patent application Ser. No. 12/780,214, titled "SYSTEM AND METHOD FOR LOGICAL PEOPLE GROUPS", filed May 14, 2010, now U.S. Pat. No. 8,819,055, issued Aug. 26, 2014; and U.S. patent application Ser. No. 12/780,356, titled "DYNAMIC HUMAN WORKFLOW TASK ASSIGNMENT USING BUSINESS RULES", filed May 14, 2010.

FIELD OF INVENTION

The invention is generally related to workflows and workflow tasks, and particularly to a system and method for providing complex access control in workflows.

BACKGROUND

Business processes, which may also be referred to as business flows or workflows, provide a level of abstraction above programming languages such as Java or C++, making them easier for non-programmers to use to describe desired processing within a particular business process. Example languages used to define business processes include, for example, the Business Process Execution Language (BPEL), which is an XML-based executable language for specifying orchestration between web services that comprise a business process; Business Process Modeling Notation (BPMN), and/or BPM.

Figure 1:
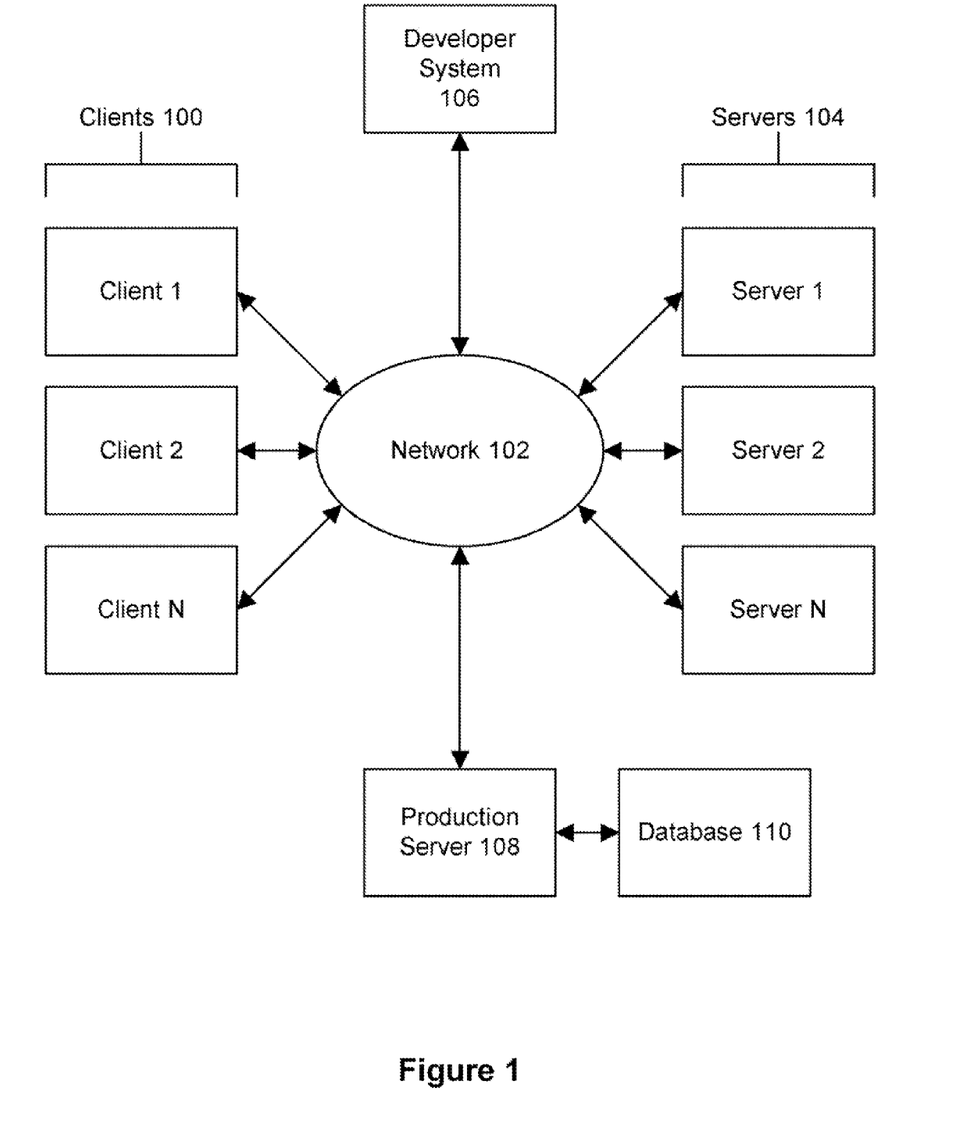
FIG. 1 shows an illustration of a typical networked computing environment.

FIG. 1 shows an illustration of a typical networked computing environment. As shown in FIG. 1, a typical networked computing environment can include a plurality of clients 100, such as Client 1, Client 2, and Client N connected to a network 102, such as the Internet. The clients can be, for example, personal computers, workstations, mobile computing devices, or any other networkable device. Also connected to the network are a plurality of servers 104 such as Server 1, Server 2, and Server N. These servers can include application servers and web servers which provide services in response to requests that are received over the network from the clients or other servers or services. A developer system 106 can provide a software developer with access to the network to create, modify, and/or deploy business processes, which can then be utilized by the plurality of clients. The developer can deploy the business processes to a production server 108, which is typically a computer server system that stores and executes the business processes. The production server can access additional business processes stored in a database 110. The production server can receive service requests from the plurality of clients, or the plurality of servers, and execute an appropriate business process. Execution of the appropriate business process can include invoking one or more web services offered by the plurality of servers.

Business processes are comprised of activities. Each activity defines actions and logic to be executed. Activities can contain other activities, and such activities are referred to herein as container activities. Each container activity includes one or more contained activities which can either be primitive activities (i.e., activities which do not contain any additional activities) or another container activity.

Activities within the business processes can assign tasks to be completed by a user or a group of users before execution of the business process can continue. Access to these tasks can be controlled by Role Based Access Control (RBAC) based on application roles and privileges associated with those application roles.

In traditional RBAC systems, actions are tied to permissions which are then granted to roles to which users and groups belong. However, RBAC provides a coarse-grain access control which is not always adequate to meet user needs or provide customizable solutions to different customers.

SUMMARY

A system and method is provided for providing complex access control in workflows. The system comprises a computer, including a computer readable storage medium and processor operating thereon. The system also comprises at least one business process which includes a plurality of tasks. Each task is associated with a task state which changes during execution of the task. The system further comprises a plurality of logical roles. Each logical role defines a responsibility based on the task state and a member of that logical role. Additionally, the system comprises a configurable matrix of access controls that is used to control access to the plurality of tasks based on the plurality of logical roles.

DETAILED DESCRIPTION

A system and method is provided for providing complex access control in workflows. The system comprises a computer, including a computer readable storage medium and processor operating thereon. The system also comprises at least one business process which includes a plurality of tasks. Each task is associated with a task state which changes during execution of the task. The system further comprises a plurality of logical roles. Each logical role defines a responsibility based on the task state and a member of that logical role. Additionally, the system comprises a configurable matrix of access controls that is used to control access to the plurality of tasks based on the plurality of logical roles.

In accordance with an embodiment, in addition to RBAC, a user's status (also referred to herein as responsibility) relative to a particular task can also be used when determining access rights. For example, the creator of a task can by default have permission to withdraw the task regardless of the application roles to which the creator belongs, based on his status as the task's creator. In RBAC-based systems, a user's status or responsibility for a particular task cannot be considered.

In accordance with an embodiment, default access for a particular status can be customized by the customer. For example, in a particular business process, the creator of a human workflow task can be denied permission to withdraw the human workflow task.

In accordance with an embodiment, configuration of the access controls can be based on external or internal events, or workflow task specific data. For example, approval of a human workflow task can be withheld until task specific data, e.g., documentation indicating that a supervisor has signed off on the task, is attached to the task. Similarly, rejection of a task can be delayed until an event has completed, such as adding a comment detailing the rejection.

In accordance with an embodiment, role based access control (RBAC) can be combined with the status or responsibility of a user of the task as well as a configurable matrix of access controls and responsibilities for the task.

Figure 2:
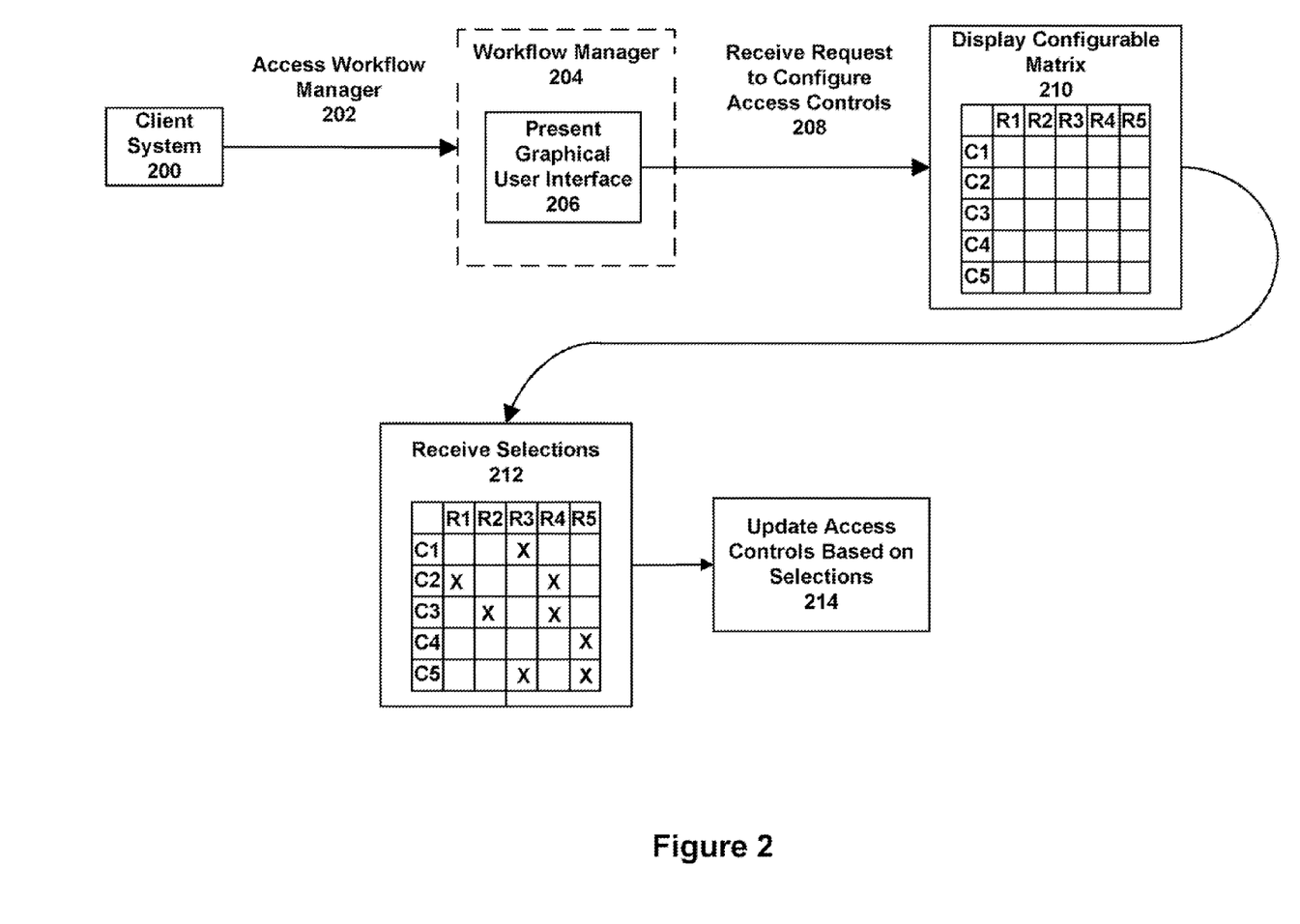
FIG. 2 shows a diagram illustrating interaction between a client and a workflow manager, in accordance with an embodiment.

FIG. 2 shows a diagram illustrating interaction between a client and a workflow manager, in accordance with an embodiment. A user using client system 200 can configure access controls for tasks by accessing 202 a workflow manager 204. The workflow manager can present a graphical user interface (GUI) 206 to the user. The user can then navigate the GUI and send a request to configure access controls. When the workflow manager receives the request 208, it can display a configurable matrix 210. Multiple matrices can be presented for different task controls. For example, a matrix of task content controls, or a matrix of task content action controls.

Configurable matrix 210 shows content rules C1-C5 versus roles R1-R5. Each role can be an RBAC role or logical roles related to a user's responsibility or status. Initially, the matrix can be displayed with a default set of access controls which can be configured previously by the user or come standard with the workflow manager. The user can configure access controls using the configurable matrix. As the workflow manager receives each selection 212, the configurable matrix can be updated to reflect the change. Once the user has finished configuring the access controls, access controls for the task are updated based on the selections 214.

In accordance with an embodiment, a user's status or responsibility for a particular task can be determined when the user attempts to perform a particular action. Each status or responsibility is effectively a logical role, for example assignee, owner, reviewer, previous approver, etc. The user's status can be determined based on the state of the task when access is requested and the identity of the user requesting access.

In accordance with an embodiment, the configurable matrix represents access rights that each different status or responsibility has for a given workflow task. A pre-defined matrix, which defines standard or commonly used access rights, can be applied by default. The access controls in the pre-defined matrix can be further restricted or extended and otherwise customized by the user. Additionally, the user can create a custom matrix of access controls to be used by default.

In accordance with an embodiment, each configuration matrix can further specify conditions. Conditions can be dynamically evaluated when each access control is determined. Conditions can be evaluated based on the human workflow task data or determined by external or internal events. Since performance of such access computation can be important, the external systems can compute the conditions asynchronously. In accordance with an embodiment, a workflow task system can call the external system with correlation keys. The external system can set the conditions asynchronously at any time.

In accordance with an embodiment, access controls can be defined both on actions a user can perform on a human workflow task instance, and also on access privileges a user has for attributes of a human workflow task instance. In accordance with an embodiment, results of RBAC are intersected with results of responsibility based access control, to determine the final access privilege.

Although RBAC provides a number of benefits, including that it can be used globally across all human workflow task instances of all types, it provides coarse grain controls. In accordance with an embodiment, applying fine grain access control based on a user's status or responsibility and conditions, in addition to traditional RBAC, can provide access control at both a business process level and also at a human workflow task instance level.

In accordance with an embodiment, access control can be configured by the user and applied to each human workflow task. Access control can also be configured at business process definition level. Access control can also be controlled separately for each instance of a particular human workflow task, thus enabling different instances of a given task to have different access control rules. This approach applies to both actions and attributes of human workflow task instances.

In accordance with an embodiment, conditions can be applied to a responsibility or status, or for a given action, for each instance of a given human workflow task. Condition validations can be performed asynchronously by the human workflow system to negative performance issues during access control computation. Conditions can be created and customized by the user using the human workflow system, these custom conditions can then be applied to given human workflow task instances.

In accordance with an embodiment, access rules can be specified for task content and actions to perform on that content. Access rules can be specified for particular parts of a task that participants can view and update, and can be enforced by the workflow service by applying rules on the task object during the retrieval and update of the task. In accordance with an embodiment, task content access rules and task actions access rules exist independently of one another.

In accordance with an embodiment, access rules can be computed based on several factors. For example, any attribute configured with access rules can decline any permissions for roles not configured against it. For example, if an access rule for a task defines that the payload of that task can be read by assignees, then only assignees have read permissions. No one, including assignees, has write permissions. In accordance with an embodiment, any attribute not configured with access rules has all permissions.

In accordance with an embodiment, if a child attribute is configured with access rules, then any access rules that may exist for the parent are ignored. For example, if a payload message attribute is configured with access rules, then configurations for the payload itself are ignored due to potential conflicts. In this example, the returned map by the API does not contain any entry for the payload. In accordance with an embodiment, write permissions can automatically provide read permissions.

In accordance with an embodiment, if only a subset of message attributes is configured with access rules, other message attributes which are not configured have all permissions. In accordance with an embodiment, comments and attachments have add permissions. Some permissions can be configured for attributes even where the permission does not affect functionality. For example, write permissions on a history attribute do not grant or decline any privileges on the history.

In accordance with an embodiment, the following 'date' attributes can be configured using the Human Task Editor. The map returned by the rules service (?) can include one key for each. If the participant does not have read permissions on DATES, the task does not contain any of the following task attributes:
  START_DATE
  END_DATE
  ASSIGNED_DATE
  SYSTEM_END_DATE
  CREATED_DATE
  EXPIRATION_DATE
  ALL_UPDATED_DATE In accordance with an embodiment, the following 'assignee' attributes can be configured using the Human Task Editor. The map returned by the rules service can include one key for each of the following. Similarly, if the participant does not have read permissions on ASSIGNEES, the task does not contain any of the following task attributes:
  ASSIGNEES
  ASSIGNEE_USERS
  ASSIGNEE_GROUPS
  ACQUIRED_BY In accordance with an embodiment, Flex fields do not have individual representation in the map returned by the rules service.

In accordance with an embodiment, all message attributes in the map returned by the rules service include a prefix.

In accordance with an embodiment, an application can also create pages to display or not display task attributes based on the access rules. This can be achieved by retrieving a participant's access rules by calling the rules service.

Figure 3:
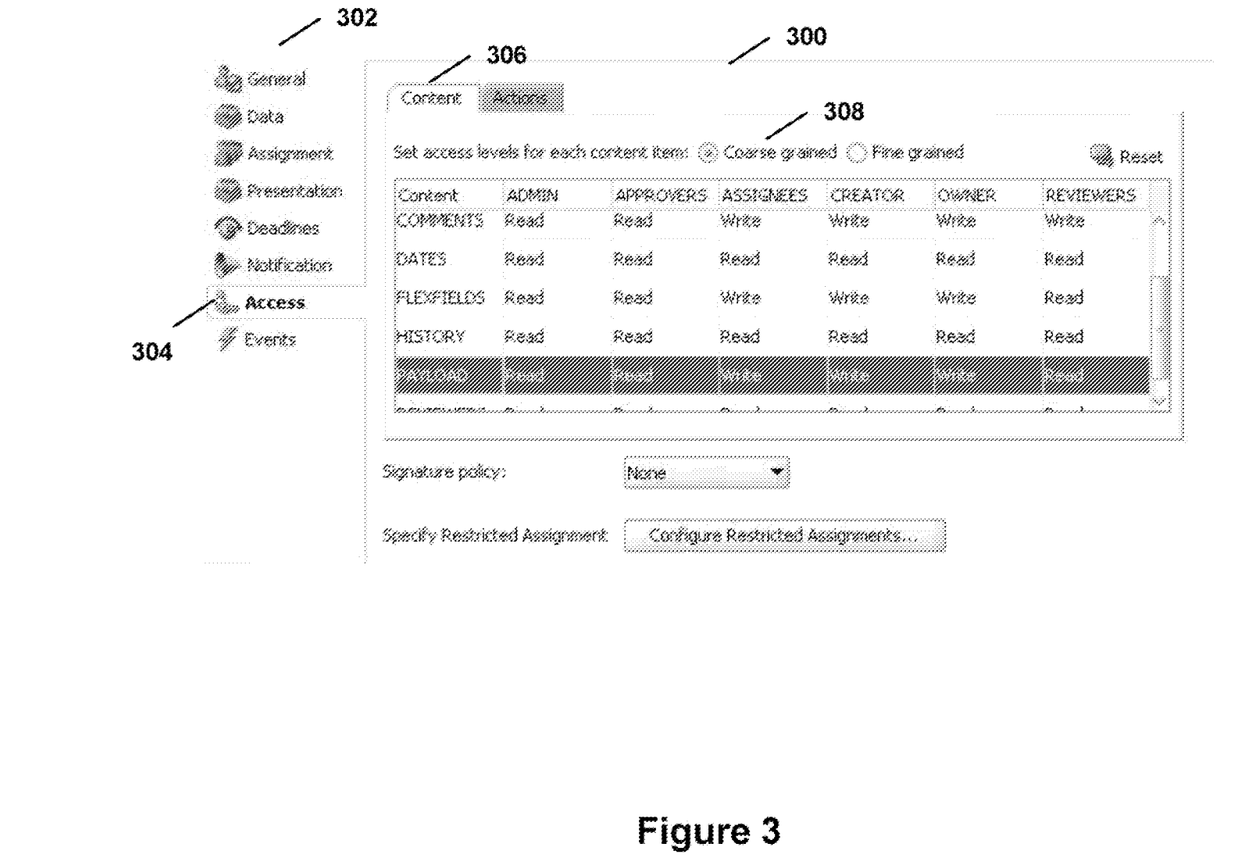
FIG. 3 shows a configurable matrix of access controls for task content, in accordance with an embodiment.

FIG. 3 shows a configurable matrix of access controls for task content, in accordance with an embodiment. Privileges can be specified for specific users (such as the task creator or owner) for acting on specific task content (such as a payload). These privileges can be specified using a configurable matrix 300 shown in a graphical user interface (GUI) 302. To specify user privileges for acting on task content, the user can select the access tab 304 in the GUI to display the matrix. Then the user can select the content tab 306 of the matrix to display the access controls for task content. This matrix shows content versus roles (such as RBAC roles, and the responsibility or status logical roles described above). The user can then select the task content for which to specify access privileges using the configurable matrix. In accordance with an embodiment, privileges can include read, write, or no access.

As shown in FIG. 3, the user can select 308 either fine or coarse grained for the method for displaying task content in this dialog. Coarse grained is shown by default, and displays the task content as a whole (for example, displays only one payload or reviewer). When the user selects fine grained the content is displayed as individual elements and the roles are displayed as individual members. For example, all payloads (such as p1, p2, and p3) and all reviewers assigned to this task (such as jstein, wfaulk, and cdickens) would be displayed. In accordance with an embodiment, access rules are applied in addition to what the system permits, depending on who is performing the action and the current state of the task.

Figure 4:
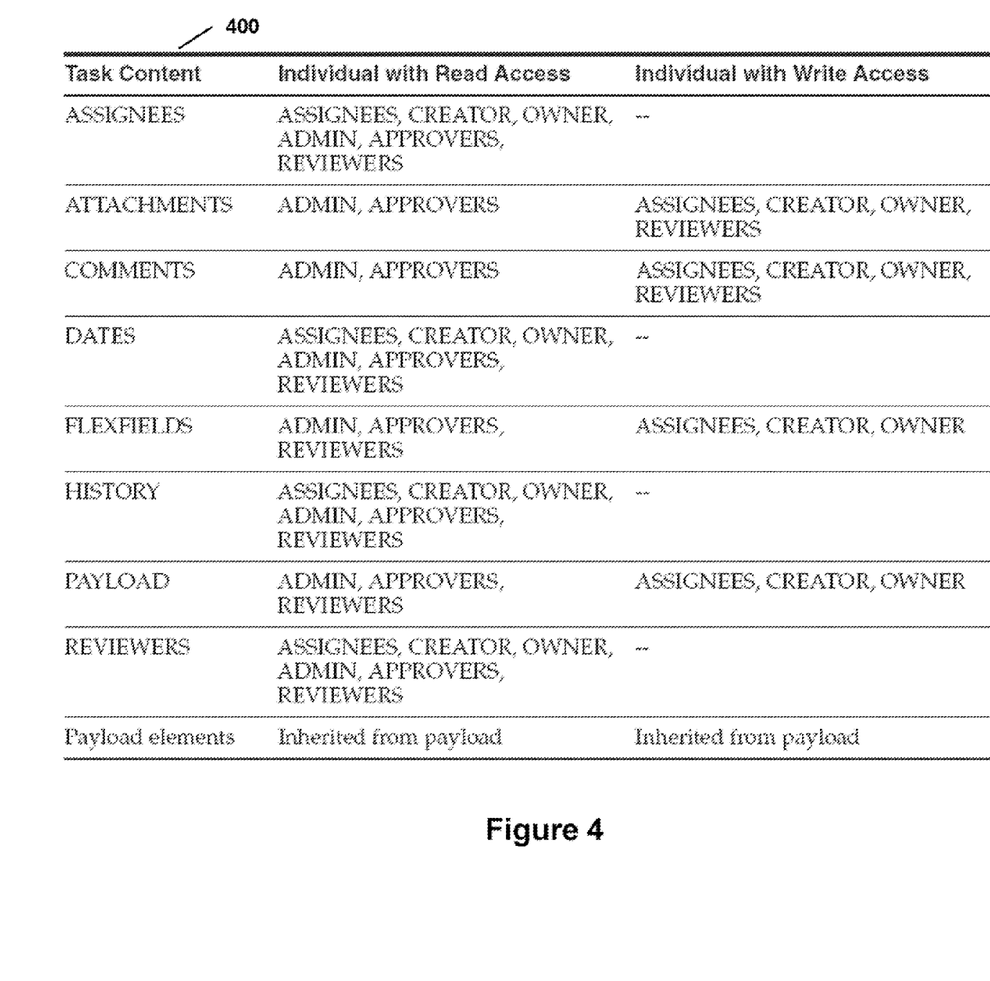
FIG. 4 shows a table of the maximum privilege each user has on task content, in accordance with an embodiment.

FIG. 4 shows a table 400 of the maximum privilege each user has on task content, in accordance with an embodiment. In accordance with an embodiment, a user cannot be assigned a privilege above their highest level. For example, as shown in the example of FIG. 4, an ADMIN user cannot be assigned write access on the PAYLOAD task content. The maximum privilege for each user can be customized, FIG. 4 is merely exemplary.

Figure 5:
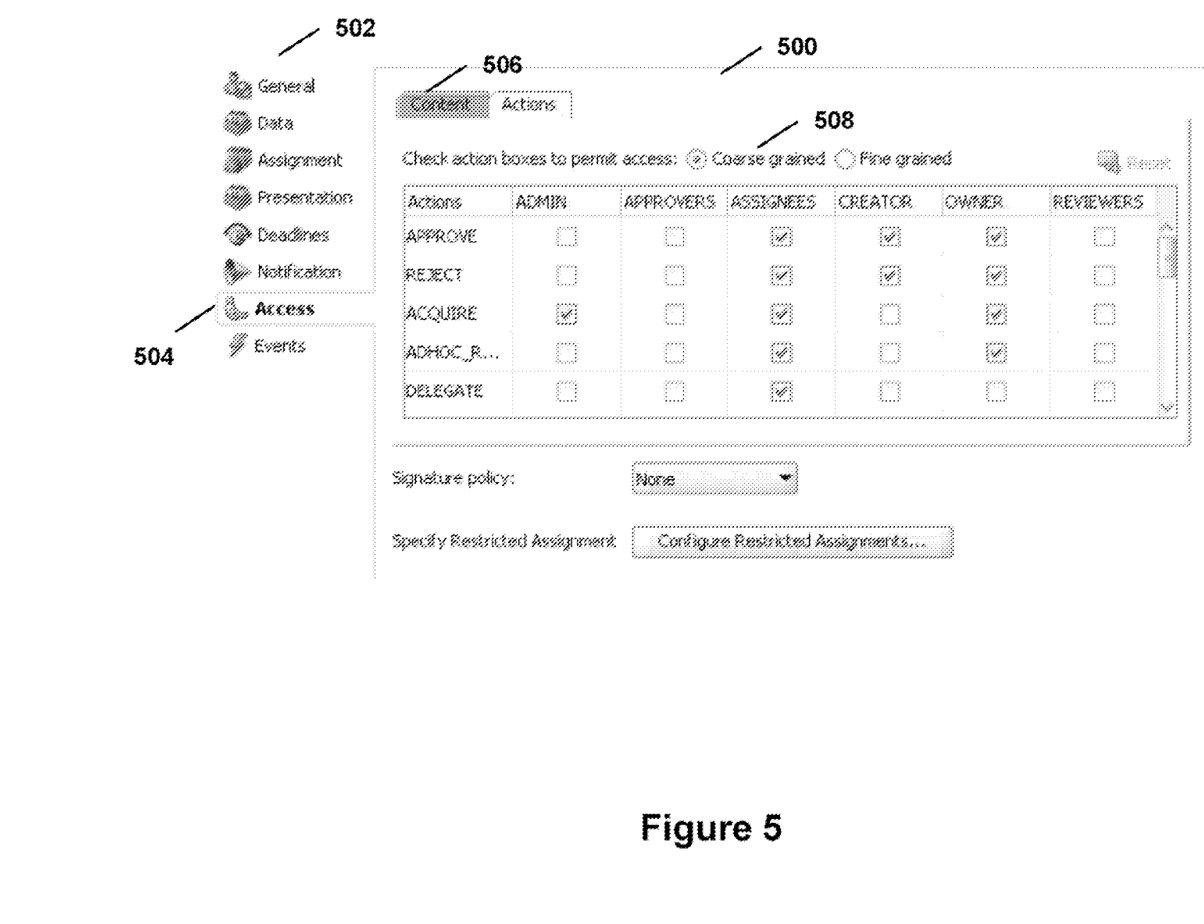
FIG. 5 shows a configurable matrix of access controls for task content actions, in accordance with an embodiment.

FIG. 5 shows a configurable matrix of access controls for task content actions, in accordance with an embodiment. Actions, which can include either access or no access, which users (such as the task creator or owner) can perform on the task content (such as a payload) can be specified using a configurable matrix 500 shown in a GUI 502. To specify actions which can be performed on task content, the user can select the access tab 504 in the GUI to display the matrix. Then the user can select the actions tab 506 of the matrix to display the access controls for task content actions. This matrix shows actions versus roles (such as RBAC roles, and the responsibility or status logical roles described above). The user can then select the task content actions which the user or role can perform using the configurable matrix. In accordance with an embodiment, privileges can include either access or no access, which may be indicated using a checkbox or other graphical indicator capable of indicating a binary selection.

As shown in FIG. 5, the user can select 508 either fine or coarse grained for the method for displaying task content actions in this dialog. Coarse grained is shown by default, and displays the task content actions as a whole (for example, displays only one approval or rejection). When the user selects fine grained the actions are for each member of the roles. For example, all APPROVE actions would be shown for all reviewers assigned to this task (such as jstein, wfaulk, and cdickens).

Figure 6:
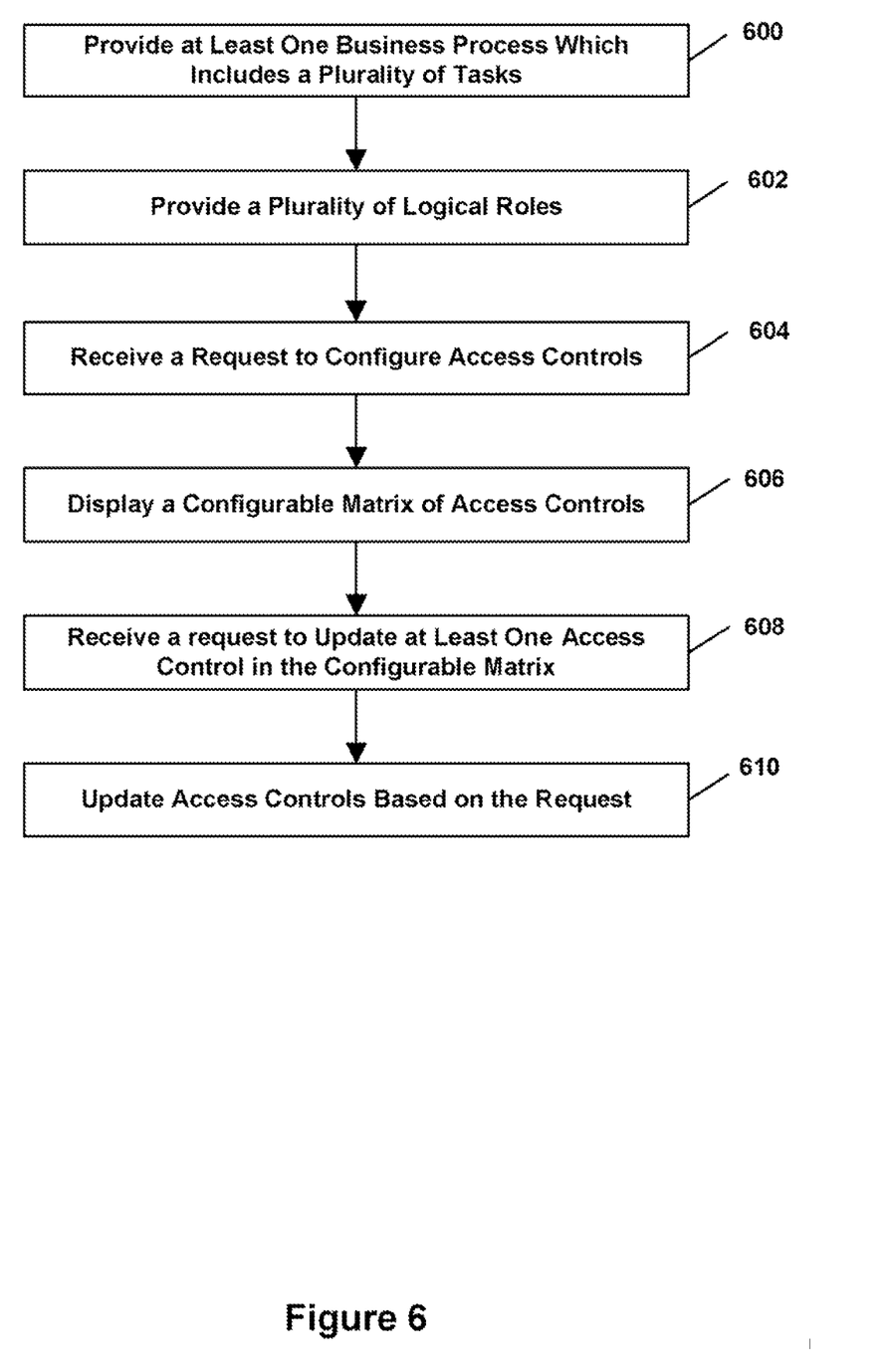
FIG. 6 shows a flowchart of a method for providing complex access control in workflows, in accordance with an embodiment.

FIG. 6 shows a flowchart of a method for providing complex access control in workflows, in accordance with an embodiment. At step 600, at least one business process which includes a plurality of tasks is provided. Each task can be associated with a task state which changes during execution of the task. At step 602, a plurality of logical roles are provided. Each logical role defines a responsibility based on the task state and a member of that logical role. Additionally, application roles used in RBAC can also be provided and utilized. At step 604 a request to configure access controls for a particular task is received. This request can be received by a human workflow manager or other manager application which can be utilized to configured access controls or other business process or task attributes. At step 606, a configurable matrix of access controls is displayed. The configurable matrix can be used to control access to the plurality of tasks based on the plurality of logical roles. At step 608, a request to update at least one access control in the configurable matrix is received. Such a request can take the form of a user checking a box in the configurable matrix, or making a selection from a menu associated with a particular control in the configurable matrix, or otherwise interacting with controls shown in the configurable matrix. At step 610, access controls for the task are updated based on the request.

The present invention can be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. In particular, although several of the embodiments described above illustrate the use of the Oracle Human Workflow system, and the use of BPEL, it will be evident that other human workflow or workflow systems, and other flow languages can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for providing complex access control in workflows, comprising:
    a computer, including one or more microprocessors;
    a workflow process, executing on the computer, which includes a plurality of tasks, wherein each task includes a plurality of task contents, and is associated with a plurality of task actions to be performed on each of the plurality of task contents;
    a workflow manager that includes a graphical user interface, wherein the graphical user interface enables displaying a first configurable matrix for controlling access to a plurality of task contents for the particular task, and a second configurable matrix for controlling access to the plurality of task actions for the particular task,
    wherein each of the first configurable matrix and the second configurable matrix includes one or more logical roles and one or more application roles,
    wherein each logical role defines a responsibility of a particular user for the particular task, and is selected from the group consisting of a creator, an assignee, an owner, a reviewer, and an approver,
    wherein each application role defines a responsibility of one or more users within an enterprise environment, and
    wherein the graphical user interface further enables displaying each member in each of the one or more logical roles, and each member in each of the one or more application roles in both the first configurable matrix and the second configurable matrix;
    wherein the work flow manager is configured to
    receive a state of the particular task in real-time during execution of the particular task from an external source using a service configured for the graphical user interface,
    determine, based on the state of the particular task, that one or more task contents in the first configurable matrix and one or more task actions in the second configurable matrix are not selectable,
    receive one or more selections of task contents in the first configurable matrix, and one or more selections of task actions in the second configurable matrix, wherein each of the selections corresponds to a logical role or an application role, and
    control access to the particular task based on the selections of task contents and task actions.

2. The system of claim 1, wherein the first configurable matrix shows the plurality of roles along one axis and the task contents along a second axis for the particular task.

3. The system of claim 1, wherein the second configurable matrix shows the plurality of roles along one axis and task actions along a second axis for the particular task.

4. The system of claim 1, wherein each of the first configurable matrix and the second configurable matrix is configured to display the plurality of task contents or the plurality of task actions for the one or more logical roles and the one or more application roles without displaying each individual member of each role.

5. The system of claim 1, wherein each of the first configuration matrix and the second configurable matrix is further to control access to the particular task based on one of an external event, or workflow specific data.

6. The system of claim 1, wherein the graphical user interface includes a first tab for triggering the display of the first configurable matrix, and a second tab for triggering the display of the second configurable matrix.

7. The system of claim 1, wherein the plurality of task contents for the particular task includes a payload and a plurality of attributes of the payload.

8. A method for providing complex access control in workflows, comprising:
    providing, on a computer including one or more microprocessors, a workflow process which includes a plurality of tasks, wherein each task includes a plurality of task contents, and is associated with a plurality of task actions to be performed on each of the plurality of task contents;

displaying, in a graphical user interface of a workflow manager, a first configurable matrix for controlling access to a plurality of task contents for the particular task, and a second configurable matrix for controlling access to the plurality of task actions for the particular task,
  wherein each of the first configurable matrix and the second configurable matrix includes one or more logical roles and one or more application roles,
  wherein each logical role defines a responsibility of a particular user for the particular task, and is selected from the group consisting of a creator, an assignee, an owner, a reviewer, and an approver,
  wherein each application role defines a responsibility of one or more users within an enterprise environment, and
  wherein the graphical user interface further enables displaying each member in each of the one or more logical roles, and each member in each of the one or more application roles in both the first configurable matrix and the second configurable matrix;
receiving, at the workflow manager, a state of the particular task in real-time during execution of the particular task from an external source using a service configured for the graphical user interface,
determining, based on the state of the particular task, that one or more task contents in the first configurable matrix and one or more task actions in the second configurable matrix are not selectable,
receiving one or more selections of task contents in the first configurable matrix, and one or more selections of task actions in the second configurable matrix, wherein each of the selections corresponds to a logical role or an application role; and
performing, via the workflow manager, control access to the particular task based on the selections of task contents and task actions.

9. The method of claim 8, wherein the first configurable matrix shows the plurality of roles along one axis and the task contents along a second axis for the particular task.

10. The method of claim 8, wherein the second configurable matrix shows the plurality of roles along one axis and task actions along a second axis for the particular task.

11. The method of claim 8, wherein each of the first configurable matrix and the second configurable matrix is configured to display the plurality of task contents or the plurality of task actions for the one or more logical roles and the one or more application roles without displaying each individual member of each role.

12. The method of claim 8, wherein each of the first configuration matrix and the second configurable matrix is further to control access to the particular task based on one of an external event, or workflow specific data.

13. The method of claim 8, wherein the graphical user interface includes a first tab for triggering the display of the first configurable matrix, and a second tab for triggering the display of the second configurable matrix.

14. The method of claim 8, wherein the plurality of task contents for the particular task includes a payload and a plurality of attributes of the payload.

15. A non-transitory computer readable storage medium, including instructions stored thereon which when read and executed by a computer cause the computer to perform the steps comprising:
  executing, on a computer including one or more microprocessors, a workflow process which includes a plurality of tasks, wherein each task includes a plurality of task contents, and is associated with a plurality of task actions to be performed on each of the plurality of task contents;
  displaying, in a graphical user interface of a workflow manager, a first configurable matrix for controlling access to a plurality of task contents for the particular task, and a second configurable matrix for controlling access to the plurality of task actions for the particular task,
    wherein each of the first configurable matrix and the second configurable matrix includes one or more logical roles and one or more application roles,
    wherein each logical role defines a responsibility of a particular user for the particular task, and is selected from the group consisting of a creator, an assignee, an owner, a reviewer, and an approver,
    wherein each application role defines a responsibility of one or more users within an enterprise environment, and
    wherein the graphical user interface further enables displaying each member in each of the one or more logical roles, and each member in each of the one or more application roles in both the first configurable matrix and the second configurable matrix;
  receiving, at the workflow manager, a state of the particular task in real-time during execution of the particular task from an external source using a service configured for the graphical user interface,
  determining, based on the state of the particular task, that one or more task contents in the first configurable matrix and one or more task actions in the second configurable matrix are not selectable,
  receiving one or more selections of task contents in the first configurable matrix, and one or more selections of task actions in the second configurable matrix, wherein each of the selections corresponds to a logical role or an application role; and
  performing, via the workflow manager, control access to the particular task based on the selections of task contents and task actions.

16. The non-transitory computer readable storage medium of claim 15, wherein the first configurable matrix shows the plurality of roles along one axis and the task contents along a second axis for the particular task.

17. The non-transitory computer readable storage medium of claim 15, wherein each of the first configurable matrix and the second configurable matrix is configured to display the plurality of task contents or the plurality of task actions for the one or more logical roles and the one or more application roles without displaying each individual member of each role.

18. The non-transitory computer readable storage medium of claim 15, wherein each of the first configuration matrix and the second configurable matrix is further to control access to the particular task based on one of an external event, or workflow specific data.

19. The non-transitory computer readable storage medium of claim 15, wherein the graphical user interface includes a first tab for triggering the display of the first configurable matrix, and a second tab for triggering the display of the second configurable matrix.

20. The non-transitory computer readable storage medium of claim 15, wherein the plurality of task contents for the particular task includes a payload and a plurality of attributes of the payload.

* * * * *

UNITED STATES PATENT AND TRADEMARK OFFICE
CERTIFICATE OF CORRECTION

PATENT NO. : 9,741,006 B2
APPLICATION NO. : 12/780183
DATED : August 22, 2017
INVENTOR(S) : Svetov et al.

Page 1 of 1

It is certified that error appears in the above-identified patent and that said Letters Patent is hereby corrected as shown below:

On Page 2

Column 2, under Other Publications, Line 11, delete "Launchs" and insert -- Launches --, therefor.

Column 2, under Other Publications, Line 12, delete "Processs" and insert -- Process --, therefor.

On Page 3

Column 1, under Other Publications, Line 4, delete "Hamburn-Harburg" and insert -- Hamburg Harburg --, therefor.

Column 1, under Other Publications, Line 5, delete "Verion" and insert -- Version --, therefor.

Column 1, under Other Publications, Line 5, delete "IBm" and insert -- IBM --, therefor.

Column 1, under Other Publications, Line 17, under "Systems, Inc. Hazlet, NJ, USA." insert -- Workflow Management Coalition - Workflow Standard - Interoperability Abstract Specification Copyright 1999 The Workflow Management Coalition Version 2.0b November 30, 1999. --.

Signed and Sealed this
Second Day of July, 2019

Andrei Iancu
*Director of the United States Patent and Trademark Office*